Sept. 20, 1966      L. P. BUNGE      3,273,252
SQUARENESS INDICATOR
Filed Dec. 4, 1964
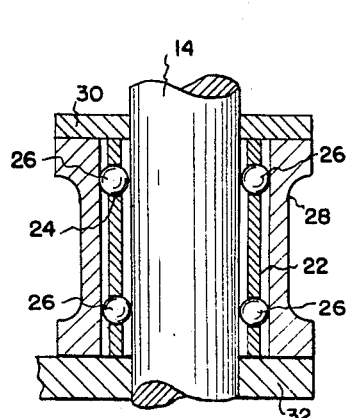
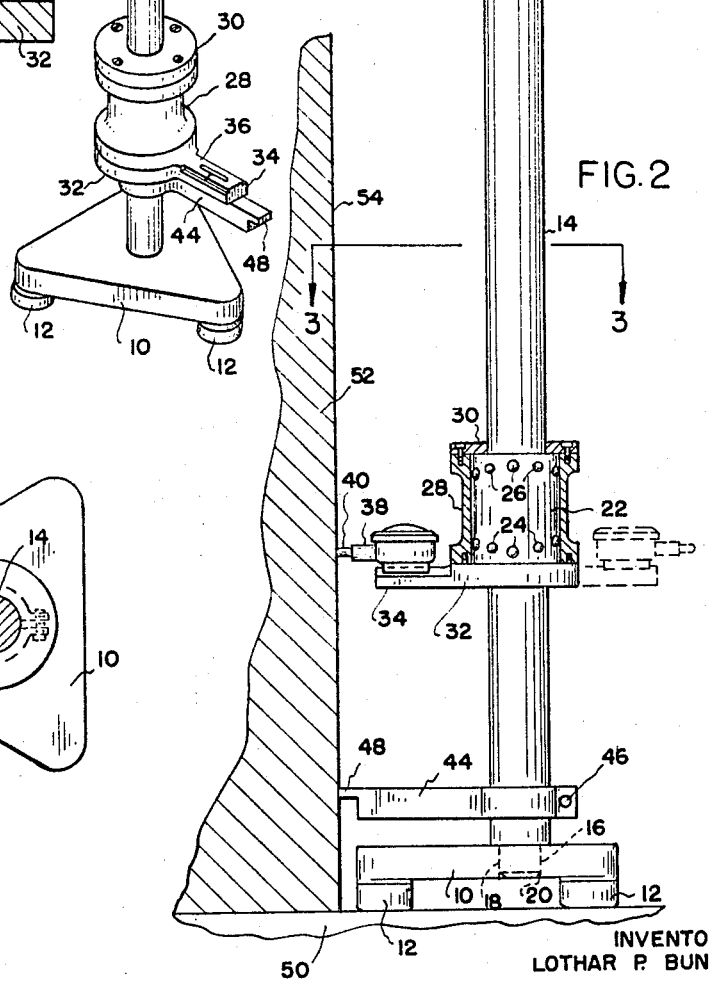
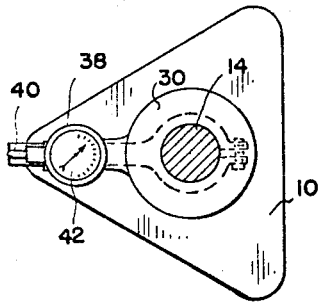
INVENTOR.
LOTHAR P. BUNGE.
BY *Allen M Krass*
ATTORNEY

United States Patent Office 3,273,252
Patented Sept. 20, 1966

1

3,273,252
SQUARENESS INDICATOR
Lothar P. Bunge, 3312 11 Mile Road, Warren, Mich.
Filed Dec. 4, 1964, Ser. No. 416,016
1 Claim. (Cl. 33—174)

This invention relates to a gauge device which may be used by a toolmaker to determine the squareness of surfaces on workpieces and more particularly to such a device which does not require a standard square surface for use in calibration.

During manufacturing processes it is often necessary to determine whether a pair of surfaces are formed to exactly 90 degrees of one another, or to determine the amount by which the surfaces deviate from that relationship. To make this measurement one of the surfaces is supported on a surface plate which constitutes a highly accurate flat surface, disposed in a horizontal plane. Some form of gauge or checking device incorporating a pair of perpendicular surfaces is supported on the surface plate using one of the normal surfaces as a base. An indicator dial is then supported on the device's perpendicular surface (usually an upright column) and distances between this surface and the perpendicular surface of the workpiece are gauged to determine the squareness of the workpiece.

Previous squareness gauges have thus depended for their accuracy on the squareness of the upright column with respect to the base. Accordingly they have all incorporated some means for adjusting the angular relation between the column and the base and in practice, before use, they are checked against a high precision master plate and their squareness is adjusted with respect to the master.

The present invention contemplates a squareness checking gauge of the type incorporating a base adapted to be supported on a surface plate and an upright column extending from the base. A support for an indicator gauge is movable along the column and the relationship of the base, the column and the indicator support are such that the gauge formed in accordance with the present invention may be prepared for use by calibrating it against any generally vertical surface rather than a master. The central feature of the present invention which allows the device to be used in this manner is the method of retention of the indicator support with respect to the base and the column. The indicator support is retained so that it may be moved between two positions with respect to the base and the column, which positions are displaced 180 degrees with respect to one another.

This feature is made use of in aligning the device in the following manner. The device is first brought into position with respect to a generally vertical surface and the indicator dial probe is brought into contact with the surface and zeroed by rotating the dial face in the well-known manner. The indicator support is then moved vertically on the column so that the indicator probe then contacts the checking surface at a different height. The deviation between these two readings is noted. Then the base of the device is rotated 180 degrees with respect to the checking surface. The indicator support is also rotated 180 degrees with respect to the base so that it again projects away from the column in the direction of the checking surface. Indicator readings are then taken at the same two points on the checking block as were the initial readings, and the deviation of these two readings is noted. If the column of the gauging device is absolutely square with respect to its base and the surface plate the deviation of the two sets of readings will be exactly equal and in opposite directions. If the vertical column is not absolutely square the two deviations will differ from one another and the inclination of the vertical column with respect to its base and the surface plate will be equal to one half of the difference between the two deviations in the distance between the two checking heights. The device is then ready for use in checking tool work or production parts. If an inclination other than 90 degrees has been noted this inclination may be taken into consideration in checking the squareness of other parts. By noting the distance between the deviations and calculating the angle of the column with respect to its base the gauge may then be employed to check other heights than those for which it was calibrated and its accuracy depends only upon the straightness of the column rather than the squareness of the column with respect to its base.

Another aspect of the invention lies in the method of retaining the indicator dial support on the vertical column. While the necessary 180 degree motion of the indicator support with respect to its base might be achieved by rotating the vertical column with respect to the base and retaining the indicator support fixed on the column, in a preferred embodiment of the present invention which will subsequently be disclosed in detail, the column is fixed with respect to the base and the indicator support is rotatable with respect to the column and thereby with respect to the base.

The indicator dial support, therefore, must be movable vertically with respect to the column and rotatable thereon. It is desirable that the support be easily rotatable and require a greater force to achieve vertical movement, to eliminate the possibility of vibration and gravity forces causing the indicator to move vertically. In the preferred embodiment this is achieved by a collar arrangement wherein a tubular ball retainer having a plurality of ball bearings supported therein is fitted directly onto the column. An outer sleeve which retains the dial indicator support is then fitted about the outer side of the retainer. When the outer sleeve is rotated each of the balls is rotated and the retainer rotates at one half the speed of the outer sleeve. However, when the sleeve is moved vertically along the column the ball retainer is forced to move at the same speed and thus the balls must slip against the column and the outer sleeve, so that a larger force is required to move the sleeve vertically than is required to rotate it.

In order to achieve the proper force relationship the sleeve and the balls must be press-fitted between the column and the sleeve. It has been found that to achieve a desirable relation for the forces required to rotate the sleeve with respect to the forces required to move it vertically the diameter of the vertical column plus twice the diameter of the balls should exceed the internal diameter of the sleeve by an amount not exceeding 0.002 inch and not less than 0.00005 inch.

The present invention also incorporates a work stop which is retained on the vertical column and projects radially outward therefrom a predetermined amount. This stop allows the gauging device to be positionally aligned with respect to surfaces to be measured and is particularly useful when a number of identical parts are to be gauged.

It is therefore seen to be a primary object of the present invention to provide a squareness gauging device having a base, a column extending normally with respect to the base, and an indicator support movable vertically on the column and radially with respect to the base between at least two positions at least 180 degrees out of line with one another, whereby the device may be aligned on any generally vertical surface.

Another object is to provide such a gauging device wherein the vertical column is cylindrical and the gauge support is movable vertically on the column and rotatable with respect thereto.

Another object is to provide such a gauging device wherein the dial indicator support attaches to the outer race of a ball bearing and the central vertical column forms the inner race so that the ball retainer must move with the outer race during the vertical movement but may move at one half the speed of the outer race during the rotational movement, producing a differential between the forces required to achieve these two movements.

Other objects, advantages, and applications of the present invention will be made apparent by the following detailed description of the preferred embodiment of the invention. The description makes reference to the accompanying drawings in which:

FIGURE 1 is a perspective view of the preferred embodiment of my gauging device;

FIGURE 2 is a side view showing a dial indicator mounted on the device and showing the device in gauging position with respect to a workpiece;

FIGURE 3 is a top view of the device as shown in FIGURE 2; and

FIGURE 4 is a cross-sectional view through the indicator dial support.

Referring to the drawings, the base of the device is formed of a triangular plate 10 having rounded edges. A hardened jig button 12 is affixed to each of the three corners of the lower side of the plate 10. The lower surfaces of the buttons 12 may be ground to a high degree of accuracy to insure that the base 10 is exactly in alignment with a surface plate 50 on which it may be supported. A central vertical column 14 formed of hardened steel is fixed to the center of the base 10 by means of a reduced diameter end 16 which extends through a drilled hole 18 in the base. The lower end of the reduced diameter section 16 is welded to the under side of the base as at 20 to prevent any displacement of the shaft with respect to the base. The shaft 14 is accurately aligned in the manufacture of the gauge device to insure that it extends normally to the surface defined by the lower sides of the buttons 12.

A tubular ball retaining sleeve 22 surrounds the column 14. The retainer has a thickness less than the diameter of the balls so that the balls project from both sides of the retainer. The retainer has a plurality of holes 24 formed in two rings about its upper and lower sides. The holes 24 are staggered in height with respect at one another in the vertical direction by approximately 1/32 inch. This insures that the balls will track separately as the indicator dial support is rotated on the column 14. The retainer 22 and the balls 26 which are supported in the holes 24 are disposed within a cylindrical outer sleeve 28. The sleeve has an internal diameter which is preferably 0.0001 inch less than the diameter of the column plus the diameter of two balls which are disposed on opposite sides of the column. Thus the sleeve and the balls are press fitted on the column 14. As has been noted the press fit could vary from 0.002 inch to 0.00005 inch.

The retainer 22 is supported within the sleeve 28 by an angular top plate 30 which bolts into the top side of the sleeve 28 and by an indicator support plate 32 which bolts into the bottom of the sleeve 28. The entire assembly may be rotated on the column 14 and in this process the rotation of the balls causes the retainer 22 to rotate at one half the speed of the sleeve. The press fit allows the entire assembly to be moved up and down on the column 14 by the exertion of approximately 2-5 pounds of force on the assembly. Only a few ounces of force are required to rotate the assembly on the column. In the vertical movement of the assembly, the balls 26 must slide with respect to the column because the retainer 22 is moving at the same speed as the sleeve 28.

The dial indicator support plate 32 has an extending arm 34 with a slotted track 36 formed on its upper side. This slotted track is of such configuration as to slidably support a dial indicator 38 of the standard type such as is manufactured by the Federal Company of Providence, Rhode Island. The indicator has an extending probe 40 which is adapted to contact a workpiece and a dial 42 which indicates the relative position of the end of the probe 40. The face of the dial 42 may be rotated to provide a zero indication.

The indicator gauge is completed by a stop member 44 which has an adjustable clamp 46 which retains it to the column 14. The stop has an extending section 48 adapted to abut a workpiece so as to position that workpiece with respect to the column. The stop 44 is normally disposed below the dial indicator support assembly on the column.

In use, the base 10 is supported on the surface plate 50. In order to align the gauge a member 52 which has a pair of generally, but not necessarily exactly normal surfaces is employed. This member 52 is supported on the surface plate 50 so that one of the surfaces 54 extends generally vertically with respect to the plate. The probe 40 is then brought into contact with the surface 54 and the indicator dial 42 is rotated to zero out the dial. The surface 54 may be aligned with the column 14 by bringing it into contact with the probe 48 on the end of the stop 44 during this process. The dial indicator assembly is then moved vertically on the column 14 and another indicator reading is taken. The deviation between these two readings is noted. The entire gauge device is then rotated on its base 10 180 degrees with respect to the workpiece. The sleeve 28 is then rotated through 180 degrees so that the indicator probe 48 again contacts the workpiece. Readings are then taken at the same two heights as previously. The deviation between these two readings is noted and compared with the deviation between the first set of readings. If the two deviations are identical and in opposite directions this indicates that the shaft 14 is exactly normal to the base 10 and the surface of the plate 50. This is true independently of the inclination of the surface 54 with respect to its base, which inclination only affects the amount of deviation noted between successive readings. However, if the column 14 is not absolutely normal to its base 10 the two successive sets of deviations will not be equal. The inclination of the column between the heights of the two measurements is equal to one half of he difference between the two separate deviations. The gauge device may then be used to gauge surfaces of various workpieces and their deviations from squareness may be simply determined.

Having thus described my invention, I claim:

A gauge of the type described, comprising: a planar base; a plurality of buttons fixed to one side of said base and having their surfaces which extend away from said base formed in a common plane so as to support said base with respect to a plane surface; a hole formed through the thickness of said base; a cylindrical column having a small diameter neck at one end disposed in said hole so as to support said column normally with respect to the base and said plane surface; a dial indicator support assembly consisting of a tubular ball retainer having a plurality of holes formed therein, an outer sleeve surrounding said retainer, a plurality of balls disposed within said retainer so as to contact the column and the outer sleeve, and a dial indicator support plate fixed to said outer sleeve and having a section extending radially with respect to said column; and a dial indicator fixed to said extending section so that its probe extends radially with respect to said column, the diameter of said column plus the diameter of two of the balls along the diameter of the column exceeds the inner diameter of the sleeve by not more than .002 inch, whereby a press fit is achieved between the sleeve, the balls, and the column so that said sleeve may be rotated with respect to said column with a relatively small force relative to the force required to move said sleeve along the length of said column.

References Cited by the Examiner

UNITED STATES PATENTS

| | | | |
|---|---|---|---|
| 1,345,597 | 7/1920 | Jantsch et al. | 33—174 |
| 2,311,815 | 2/1943 | Briney | 308—6 |
| 2,469,904 | 5/1949 | Szuba | 248—1 |
| 2,669,022 | 2/1954 | Sajatovich | 33—27 |
| 2,965,970 | 12/1960 | Rocheieau | 33—172 |
| 2,969,597 | 1/1961 | Croshier | 33—174 |
| 3,067,518 | 12/1962 | Herman | 33—174 |

FOREIGN PATENTS 575,031   1/1946   Great Britain.

LEONARD FORMAN, *Primary Examiner.*

ISAAC LISANN, *Examiner.*

H. N. HAROIAN, *Assistant Examiner.*